(12) United States Patent
Gale (10) Patent No.: US 8,585,565 B2
(45) Date of Patent: Nov. 19, 2013

(54) METHOD FOR FORMING THREE-DIMENSIONAL SUPPORT STRUCTURE

(75) Inventor: Gregory W. Gale, Napa, CA (US)

(73) Assignee: Tessellated Group, LLC, Napa, CA (US)

( * ) Notice: Subject to any disclaimer, the term of this patent is extended or adjusted under 35 U.S.C. 154(b) by 0 days.

(21) Appl. No.: 13/487,107

(22) Filed: Jun. 1, 2012

(65) Prior Publication Data

US 2012/0328848 A1 Dec. 27, 2012

Related U.S. Application Data

(63) Continuation of application No. 12/794,513, filed on Jun. 4, 2010, now Pat. No. 8,192,341, which is a continuation of application No. 11/459,550, filed on Jul. 24, 2006, now Pat. No. 7,762,938.

(51) Int. Cl.
  *B31F 1/00* (2006.01)
  *E04C 2/32* (2006.01)

(52) U.S. Cl.
  USPC ............. 493/395; 52/783.16; 52/783.17; 52/793.11; 52/793.1; 428/121; 428/124; 428/130; 428/176; 428/178; 428/179; 428/181; 428/182

(58) Field of Classification Search
  None
  See application file for complete search history.

(56) References Cited

U.S. PATENT DOCUMENTS

| | | | |
|---|---|---|---|
| 1,875,188 A | 8/1932 | Williams | |
| 2,042,245 A | 5/1936 | Archea | |
| 2,160,677 A | 5/1939 | Romanoff | |
| 2,481,046 A | 9/1949 | Scurlock | |
| 2,796,157 A | 6/1957 | Ginsburg | |
| 2,826,239 A | 3/1958 | Villoresi | |
| 2,896,692 A | 7/1959 | Villoresi | |

(Continued)

FOREIGN PATENT DOCUMENTS

| | | |
|---|---|---|
| DE | 4130622 A1 | 3/1993 |
| GB | 2 123 874 A | 2/1984 |

(Continued)

OTHER PUBLICATIONS

Dec. 29, 2009 Chilean Associate's transmittal letter and comments regarding a First Official Action issued by the Patent Office for corresponding Chilean patent application No. 2150-2007; pp. 1-13

(Continued)

*Primary Examiner* — David Sample
*Assistant Examiner* — Nicole T Gugliotta
(74) *Attorney, Agent, or Firm* — Dorsey & Whitney LLP (57) ABSTRACT

A three-dimensional support structure is provided and includes a single sheet of material that is folded into a repeating pattern of cells. Each of the cells is formed by first and second spaced-apart endwalls and first and second sloped sidewalls spanning between the endwalls. Each endwall comprises two plies of material while each sidewall comprises a single ply of material. The first and second sidewalls are adjoined at a folded edge. The cells are aligned such that the first endwall of one cell from the repeating pattern abuts the second endwall of an adjacent cell of the repeating pattern to form a four-ply wall of the material. A first liner may be attached to a first side of the folded material and a second liner may be attached to a second side of the folded material.

20 Claims, 8 Drawing Sheets

(56) References Cited

U.S. PATENT DOCUMENTS

| | | | |
|---|---|---|---|
| 2,901,951 A | 9/1959 | Hochfeld | |
| 2,950,656 A | 8/1960 | Gewiss | |
| 3,199,468 A | 8/1965 | Sullivan | |
| 3,515,036 A | 6/1970 | Oki et al. | |
| 3,542,636 A | 11/1970 | Wandel | |
| 3,545,249 A | 12/1970 | Brown | |
| 3,709,161 A | 1/1973 | Kauffman | |
| 3,776,145 A | 12/1973 | Anderson et al. | |
| 3,849,237 A | 11/1974 | Zetlin | |
| 3,850,116 A | 11/1974 | Mackes | |
| 3,906,571 A | 9/1975 | Zetlin | |
| 3,982,057 A | 9/1976 | Briggs et al. | |
| 3,992,162 A * | 11/1976 | Gewiss | 428/604 |
| 4,012,932 A | 3/1977 | Gewiss | |
| 4,042,127 A | 8/1977 | Brossia | |
| 4,049,855 A | 9/1977 | Cogan | |
| 4,472,473 A | 9/1984 | Davis et al. | |
| 4,507,348 A | 3/1985 | Nagata et al. | |
| 4,562,718 A | 1/1986 | Dunk | |
| 4,607,783 A | 8/1986 | Mansbridge et al. | |
| 4,906,510 A | 3/1990 | Todor, Jr. et al. | |
| 4,981,732 A | 1/1991 | Hoberman | |
| 5,028,474 A * | 7/1991 | Czaplicki | 428/178 |
| 5,111,754 A | 5/1992 | Adams, Jr. | |
| 5,226,372 A | 7/1993 | Frenkel et al. | |
| 5,234,727 A | 8/1993 | Hoberman | |
| 5,269,219 A | 12/1993 | Juvik-Woods et al. | |
| 5,270,095 A | 12/1993 | Ito et al. | |
| 5,389,059 A | 2/1995 | Corwin | |
| 5,393,588 A | 2/1995 | Weddendorf | |
| 5,443,779 A * | 8/1995 | Ichikawa | 264/286 |
| 5,493,962 A | 2/1996 | McCarthy | |
| 5,523,141 A | 6/1996 | Fyler | |
| 5,551,353 A | 9/1996 | Fiedler | |
| 5,809,737 A | 9/1998 | Collier et al. | |
| 5,900,304 A | 5/1999 | Owens | |
| 5,947,885 A | 9/1999 | Paterson | |
| 5,997,885 A * | 12/1999 | Koulbanis et al. | 424/401 |
| 6,095,061 A | 8/2000 | Perazzo | |
| 6,155,181 A | 12/2000 | Chilcutt | |
| 6,227,515 B1 | 5/2001 | Broyles | |
| 6,274,216 B1 | 8/2001 | Gonidec et al. | |
| 6,541,098 B2 * | 4/2003 | Venkatasanthanam et al. | 428/161 |
| 6,935,997 B2 | 8/2005 | Kling | |
| 7,013,814 B2 | 3/2006 | Kling | |
| 7,410,455 B2 | 8/2008 | Modesitt et al. | |
| 7,762,938 B2 | 7/2010 | Akishev et al. | |
| 2002/0094926 A1 | 7/2002 | Kling | |
| 2005/0089675 A1 | 4/2005 | Christiansen | |
| 2005/0267616 A1 | 12/2005 | Kling | |
| 2007/0172634 A1 | 7/2007 | Kobre | |
| 2009/0029838 A1 | 1/2009 | Kling | |
| 2009/0104411 A1 | 4/2009 | Endres et al. | |

FOREIGN PATENT DOCUMENTS

| | | |
|---|---|---|
| JP | 11300863 | 11/1999 |
| JP | 2003-147899 | 5/2003 |
| JP | 2006-137029 | 6/2006 |
| WO | 2008/014184 | 1/2008 |

OTHER PUBLICATIONS

Jan. 19, 2010 Instructional letter in response to First Official Action for corresponding Chilean patent application No. 2150-2007, pp. 1-20.

Jun. 14, 2010 Chilean Associate's transmittal letter with copy of filed response to First Official Action for corresponding Chilean patent application No. 2150-2007; pp. 1-30.

Nov. 24, 2010 Chilean Associate's transmittal letter and comments regarding a Second Official Action issued by the Patent Office for corresponding Chilean patent application No. 2150-2007; pp. 1-10.

Dec. 8, 2010 Inquiry letter in response to Second Official Action for corresponding Chilean patent application No. 2150-2007, p. 1.

Dec. 20, 2010 Chilean Associate's reply Dec. 8, 2010 inquiry letter for corresponding Chilean patent application No. 2150-2007; p. 1-3.

Mar. 7, 2011 Instructional letter in response to Second Official Action for corresponding Chilean patent application No. 2150-2007, pp. 1-5.

Mar. 29, 2011 Chilean Associate's transmittal letter with copy of filed response to Second Official Action for corresponding Chilean patent application No. 2150-2007; 1-32.

Jul. 2, 2010 Chinese Associate's transmittal letter and comments regarding a First Official Action issued by the Patent Office for corresponding Chinese patent application No. 200780031108.5, pp. 1-8.

Aug. 11, 2010 Chinese Associate's analyses letter to First Official Action issued by the Patent Office for corresponding Chinese patent application No. 200780031108.5, pp. 1-2.

Oct. 8, 2010 Instructional letter in response to First Official Action for Corresponding Chinese patent No. 200780031108.5, p. 1.

Oct. 18, 2010 Chinese Associates's transmittal letter with copy of filed response to first Official Action for corresponding Chinese patent application No. 200780031108.5, pp. 1-11.

Nov. 10, 2010 Chinese Associate's email communication regarding a Telephone Interview with Examining Attorney from the Patent Office for corresponding Chinese patent application No. 200780031108.5, pp. 1-2.

Nov. 23, 2010 Instructional letter in response to Nov. 10, 2010 Telephone Interview for corresponding Chinese patent application No. 200780031108.5, pp. 1-5.

Dec. 17, 2010 Chinese Associate's transmittal letter with copy of filed response to Nov. 10, 2010 Telephone Interview for corresponding Chinese patent application No. 200780031108.5, pp. 1-5.

Mar. 1, 2011 Chinese Associate's transmittal letter regarding Notice of Allowance issued by the Chinese Patent Office for corresponding Chinese patent application No. 200780031108.5, pp. 1-3.

Sep. 23, 2010 Eurasian Associate's transmittal letter and comments regarding a Aug. 12, 2010 Official Action issued by the Patent Office for corresponding Eurasian patent application No. 200970145; pp, 1-3.

Dec. 6, 2010 Instructional letter in response to Aug. 12, 2010 Official Action for corresponding Eurasian patent application No. 200970145; p. 1.

Dec. 13, 2010 Eurasian Associate's transmittal letter with copy of filed response to Aug. 12, 2010 Official Action for corresponding Eurasian patent application No. 200970145; pp. 1-26.

Jun. 20, 2011 Eurasian Associate's transmittal letter and comments regarding a May 26, 2011 Official Action issued by the Patent Office for corresponding Eurasian patent application No. 200970145; pp. 1-6.

Sep. 22, 2011 Instructional letter in response to May 26, 2011 Official Action for corresponding Eurasian patent application No. 200970145; pp. 1-6.

Sep. 26, 2011 Eurasian Associate's transmittal letter with copy of filed response to May 26, 2011 Official Action for corresponding Eurasian patent application No. 200970145; pp. 1-29.

Feb. 11, 2010 Instructional letter to Egyptian Associate requesting preparation and filing of a Voluntary Amendment for corresponding Egyptian patent application No. 97/2009, pp. 1-17.

Jul. 5, 2010 Email communication from Egyptian Associate regarding filing of Voluntary Amendment for corresponding Egyptian patent application No. 97/2009, p. 1.

Jul. 28, 2010 Instructional letter in response to Jul. 5, 2010 email communication of Jul. 5, 2010 for corresponding Egyptian patent application No. 97/2009, pp, 1-4.

Jun. 9, 2010 European Associate's transmittal letter confirming filing our Voluntary Amendment for European patent application No. 07813139.8, pp. 1-14.

Jun. 9, 2010 European Associate's email communication regarding a Telephone Interview with Examining Attorney from the European Patent Office for corresponding European patent application No. 07813139.8, pp. 1-2.

Feb. 7, 2008 international Search Report issued by the international Bureau of WIPO for corresponding PCT patent application serial No. PCT/US2007/073932, pp. 1-4.

(56) References Cited

OTHER PUBLICATIONS

Feb. 7, 2008 Written Opinion of the International Search Authority issued by the International Bureau of WIPO for corresponding PCT patent application serial No. PCT/2007/073932, pp. 1-5.
May 23, 2008 Filed Response to Written Opinion filed with the International Bureau of WIPO for corresponding, PCT application serial No. PCT/US2006/062577, pp. 1-8.
Apr. 14, 2009 International Preliminary Report on Patentability Issued by the International Bureau of WIPO for corresponding PCT application serial No. PCT/US2006/062577, pp. 1-8.
Sep. 26, 2011 Philippine Associate's transmittal letter and comments regarding Aug. 26, 2011 Offical Action issued by the Patent Office for corresponding Philippine patent application No. 1-2009-500180, pp. 1-5.
Dec. 20, 2011 Instructional letter in response to Aug. 26, 2011 Offical Action for corresponding Philippine patent application No. 1-2009-500180, pp. 1-8.
Sep. 3, 2008 Pakistan Associate's transmittal letter and comments regarding a First Examination Report issued by the Patent Office for corresponding Pakistan patent application No. 0885/2007; pp. 1-5.
Dec. 18, 2008 Instructional letter in response to First Examination Report for corresponding Pakistan patent application No. 0885/2007; pp. 1-7.
Sep. 25, 2009 Pakistan Associate's transmittal letter and comments regarding a Second Examination Report issued by the Patent Office for corresponding Pakistan patent application No. 0885/2007; pp. 1-9.
Jan. 13, 2010 Instructional letter in response to Second Examination Report for corresponding Pakistan-patent application No. 0885/2007; pp. 1-.
Feb. 11, 2010 Further Instructional letter in response to Second Examination Report for corresponding, Pakistan patent application No. 0885/2007; pp. 1-6.
Jul. 9, 2010 Pakistan Associate's transmittal letter and comments regarding a Third Examination Report issued by the Patent Office for corresponding Pakistan patent application No. 0885/2007; pp. 1-2.
Jul. 29, 2010 Instructional letter in response to Third Examination Report for corresponding Pakistan patent application No. 0885/2007; pp. 1-5.
Aug. 19, 2010 Pakistan Associate's email communication regarding a further request by the Patent Office for corresponding Pakistan patent application No. 0885/2007; p. 1.
Aug. 19, 2010 Instructional letter in response to Aug. 19, 2010 email communication for corresponding Pakistan patent application No. 0885/2007; p. 1-.
Jan. 26, 2011 Pakistan Associate's email communication regarding a further request by the Patent Office for corresponding Pakistan patent application No. 0885/2007; p. 1.
Jan. 31, 2011 Instructional email in response to Jan. 26, 2011 email communication for corresponding Pakistan patent application No. 0885/2007; p. 1-.
Dec. 6, 2011 Vietnamese Associate's transmittal email and comments regarding Nov. 21, 2011 Official Action issued by the Patent Office for corresonding Vietnamese patent application No. 1-2009-00327, pp. 1-2.
Dec. 20, 2011 Instructional letter in response to Nov. 21, 2011 Official Action for corresponding Vietnamese patent application No. 1-2009-00327, pp. 1-8.
Dec. 3, 2009 South African Associate's transmittal letter and comments regarding preparation and filing of Voluntary Amendment with the Patent Office for corresponding South African patent application No. 2009/00552, pp. 1-2.
Jan. 14, 2010 Instructional letter in response to Dec. 3, 2009 communication for corresponding South African patent application No. 2009/00552, pp. 1-20.
Feb. 11, 2010 Further instruction letter in response to Dec. 3, 2009 communication for corresponding South African patent application No. 2009/00552, pp. 1-5.
Mar. 23, 2010 South African Associate's transmittal letter with copy of filed Voluntary Amendment for corresponding South African patent application No. 2009/00552, pp. 1-32.

* cited by examiner

METHOD FOR FORMING THREE-DIMENSIONAL SUPPORT STRUCTURE

This application is a continuation application of Ser. No. 12/794513 filed Jun. 4, 2010, now U.S. Pat. No. 8,192,341 which is a continuation application of Ser. No. 11/459,550 filed Jul. 24, 2006, now U.S. Pat. No. 7,762,938.

FIELD OF THE INVENTION

The present invention relates to structural products. More specifically, the present invention relates to three-dimensional support structures.

BACKGROUND OF THE INVENTION

Various sandwich-type structures currently exist that are used in numerous industries as components of products. These structures suffer from many drawbacks in strength, rigidity, weight, and durability.

For example, at the present time, structures for use in packaging typically use corrugated board, to form, for example, corrugated boxes. Corrugated board is a sandwich of one or more liner sheets adhered to a fluted, inner-medium. Combinations of liners and flute configurations are used to generate variations of corrugated board. The weights of material used to form the liners and medium can be adjusted to achieve desired bursting and stacking strength. However, many disadvantages to corrugated board exist. For example, corrugated board has a load bearing capacity along only a single axis (the y-axis). Additionally, to increase the width of the corrugated structure, yet retain structural stability, a multi-wall corrugated board format is often used. Typically a one, two, or three wall format corrugated board is used depending upon the width needed. Delamination of attached liners adhered to the flutes is also a problem. Namely, the flutes comprise flexible contact points resulting in an uneven application of an adhesive between the flute and the liner. Likewise, the uneven application and flexible contact points can lead to uneven surfaces for printing inks.

Corrugated board is also prone to warping during manufacture, which is a prominent issue within the industry. Moreover, the mechanical function of corrugated board and the limitations of existing machinery (such as corrugators) allow for only a narrow range of board types. Another disadvantage of corrugated board is that its preparation requires the application of steam in order to form the curved flutes. The use of steam involves the consumption of water as well as the requirement to manage the waste water within the corrugator system. Drying of the "steamed" corrugated board is also required. Drying of the steamed medium paper occurs within the forming rolls that provide the flute profiles. These rolls are sometimes heated to approximately 700 F. ° and in essence are pressing/ironing the fluted shape into the medium. As a result additional energy, time, and expense is incurred in the preparation of a product that is not very durable.

Various three-dimensional metal and plastic, and other composite material structures also exist. For example, structures, such as fuselages, wings, bulkheads, floor panels, construction panels, refrigerators, ceiling tiles, intermodal containers, and seismic walls are often formed by corrugated metal or plastic sandwich structures or hexacomb products. Unfortunately, such structures have significant weight or mass associated with the structure, and typically involve a multi-piece core which requires welding or soldering, or other adhesives for assembly. Moreover, current metal and plastic structures often flex or curve along the x-axis, making it difficult to form a rigid structure. These structures are also prone to create anticlastic curvature. As a result, these structures are often costly, contain numerous components, do not have sufficient rigidity, and are often heavy.

In view of the foregoing, there is a need in the art for a three-dimensional support structure that will overcome the foregoing deficiencies.

BRIEF SUMMARY OF THE INVENTION

An improved three-dimensional support structure is provided and includes a single sheet of material that is folded into a repeating pattern of cells. Each of the cells is formed by first and second spaced-apart endwalls and first and second sloped sidewalls spanning between the endwalls. Each endwall comprises two plies of material while each sidewall comprises a single ply of material. The first and second sidewalls are adjoined at a folded edge. The cells are aligned such that the first endwall of one cell from the repeating pattern abuts the second endwall of an adjacent cell of the repeating pattern to form a four-ply wall of the material. A first liner may be attached to a first side of the folded material and a second liner may be attached to a second side of the folded material.

Other aspects, features and details of the present invention can be more completely understood by reference to the following detailed description in conjunction with the drawings, and from the appended claims.

BRIEF DESCRIPTION OF THE DRAWINGS

The invention will now be described, by way of example, with reference to the attached drawings, of which.

DETAILED DESCRIPTION OF PREFERRED EMBODIMENTS

The present invention is embodied in a three-dimensional support structure. As will be seen by the disclosure and drawings, the structure set forth herein is structurally superior to existing products, such as container board, or corrugated board, and current sandwich-type metal and plastic structures. The structure set forth herein also requires less material, and eliminates significant amounts of process energies currently required for manufacturing.

In a preferred embodiment, the three-dimensional support structure of the present invention is for use in the manufacture and composition of packaging materials and other support materials, including but not limited to fuselages, wings, bulkheads, floor panels, construction panels, refrigerators, ceiling tiles, intermodal containers, and seismic walls. However, it is appreciated that the structure disclosed herein has other applications where its advantages may be applied.

The three-dimensional support structure 10 disclosed herein comprises a medium or material 12 folded to form a durable structure. In a preferred embodiment, the tessellated medium 12 comprises flexible member, including but not limited to, paper, metal, plastic, composite, or material of similar composition. The material may be of varying grade and thickness, as is currently commercially available, and is based upon user preferences.

Figure 1:
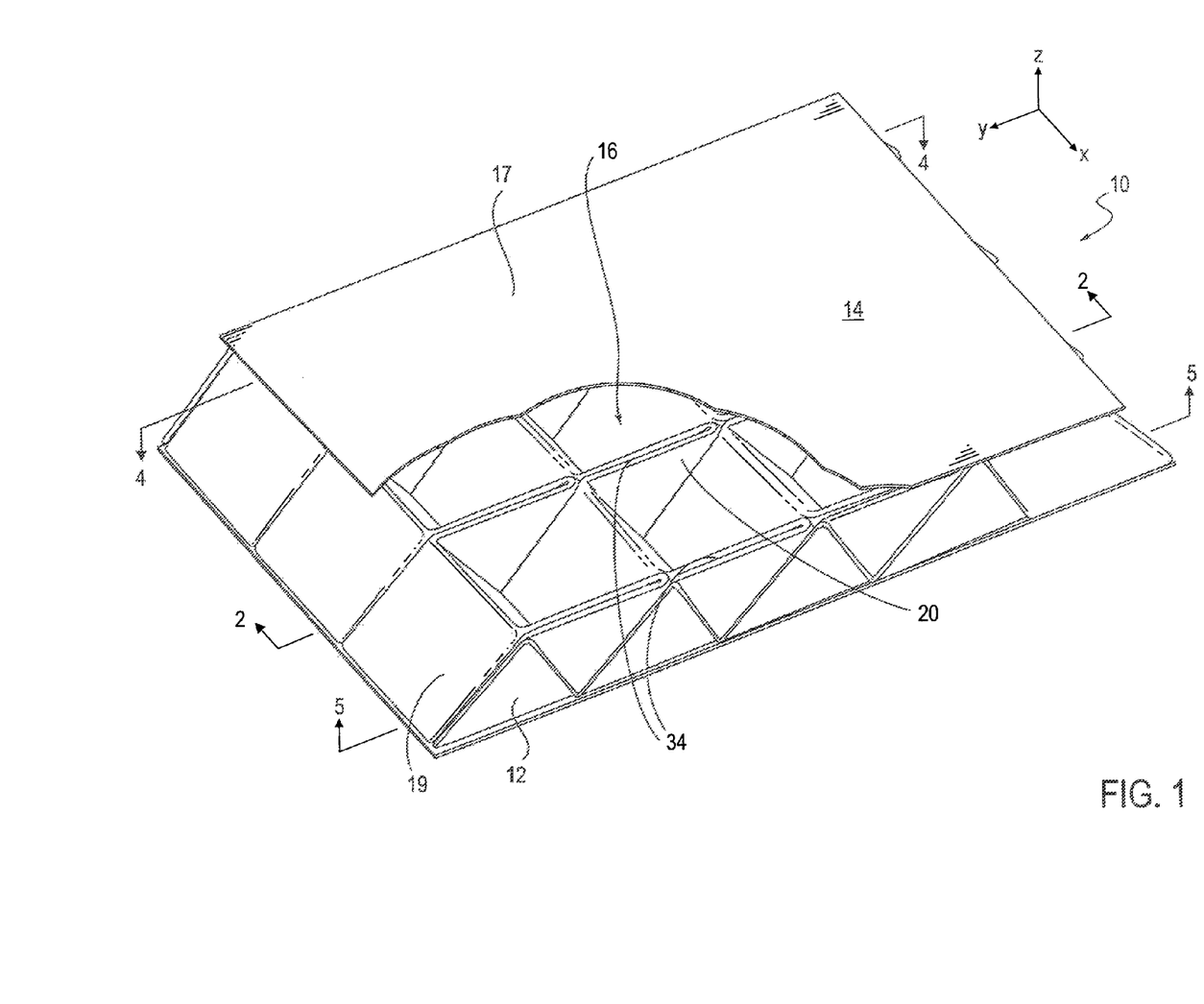
FIG. 1 is a perspective view of a structure, partially cut away, incorporating the structure of the present invention.
Figure 2:
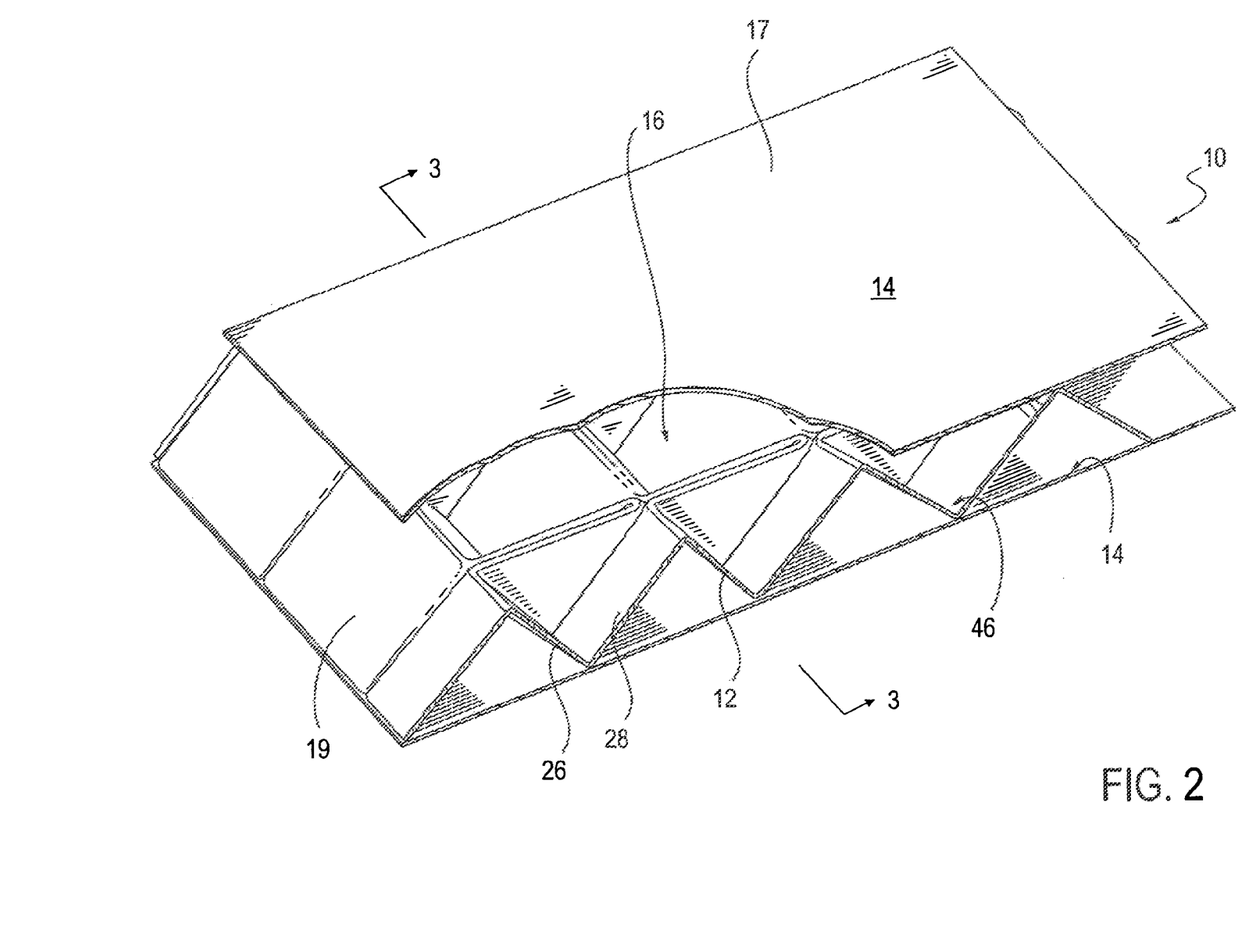
FIG. 2 is a cross-sectional, perspective view, partially cut away, of the structure of FIG. 1 taken along the line 2-2 of FIG. 1.
Figure 3:
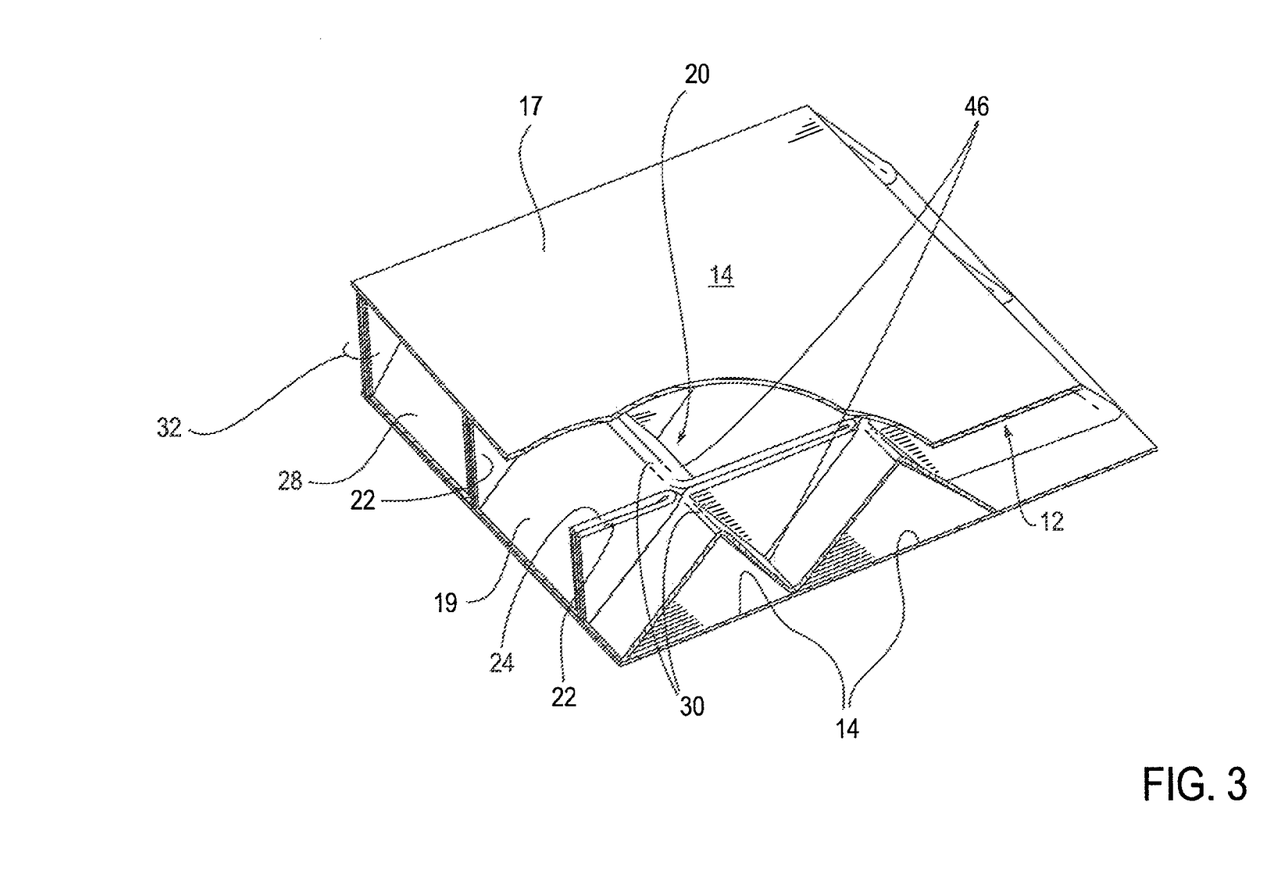
FIG. 3 is a cross-sectional, perspective view, partially cut away, of the structure of FIG. 1 taken along the line 3-3 of FIG. 2.

FIG. 1 demonstrates a view of a material, the structure 10, of the present invention. The structure 10, in its fully assembled state, comprises a folded, tessellated medium 12 and optionally one or more liners 14 attached thereto.

As can be seen from FIGS. 1-5, the structure 10 comprises a folded, tessellated medium 12 folded in multiple directions to form vertical structures in three planar orientations, namely, the x-, the y- and the z-axis. Preferably, positioned and attached to the folded medium 12 is at least one liner 14. Preferably, the liner 14 is attached to a first side or surface 16 of the folded medium 12. A liner 14 may also be attached to the second side or surface 18 of the folded medium 12. Preferably, a plurality of liners 14 are attached to the folded medium 12. More preferably, the medium 12 is sandwiched between a pair of liners 14. The liner 14 on the second surface 18 is positioned in a plane parallel to the liner 14 positioned on the first surface 16. Additional liners 14 may also be attached in various locations on the various planes and structures of the folded medium 12, depending upon the user's desire, without departing from the overall scope of the present invention.

The liner 14 is made from any suitable material 17, such as a flexible membrane of paper, metal, plastic or composites, and may be of a material and form commonly available for the relevant application. The liner 14 is preferably planar, and may be of any dimension. Preferably, the liner 14 corresponds in size to the width and length (the x- and y-axis) of the folded medium 12, but variations on the size of the liner 14 do not depart from the overall scope of the present invention.

As discussed, the medium 12 is formed from a single sheet of material 19 that is folded into a repeating pattern of cells 20 (see FIGS. 4 and 5), Each of the cells 20 is formed by, and comprises first 22 and second 24 spaced-apart endwalls and first 26 and second 28 sloped sidewalls spanning between the endwalls. Each of the endwalls 22, 24 comprises two plies of the material 12 and each of the sidewalls 26, 28 comprises a single ply of the material 12. The first 26 and second 28 sidewalls are adjoined at a folded edge 30. The cells 20 are further aligned so that the first endwall 22 of one cell 20 from the repeating pattern abuts the second endwall 24 of an adjacent cell 20 from the repeating pattern to form a four-ply wall 32 of the material 12. Each of the repeating cells 20 form opposite first 16 and second 18 surfaces having a recess or valley 46 therein. Accordingly, the folded medium 12 forms one or more wall structures 32, or rails, for support of the liner 14, and preferably forms a rigid support. The top 34 of the rails or four-ply wall 32 as well as the top edges of 30 support the liner 14 thereon.

Figure 4:
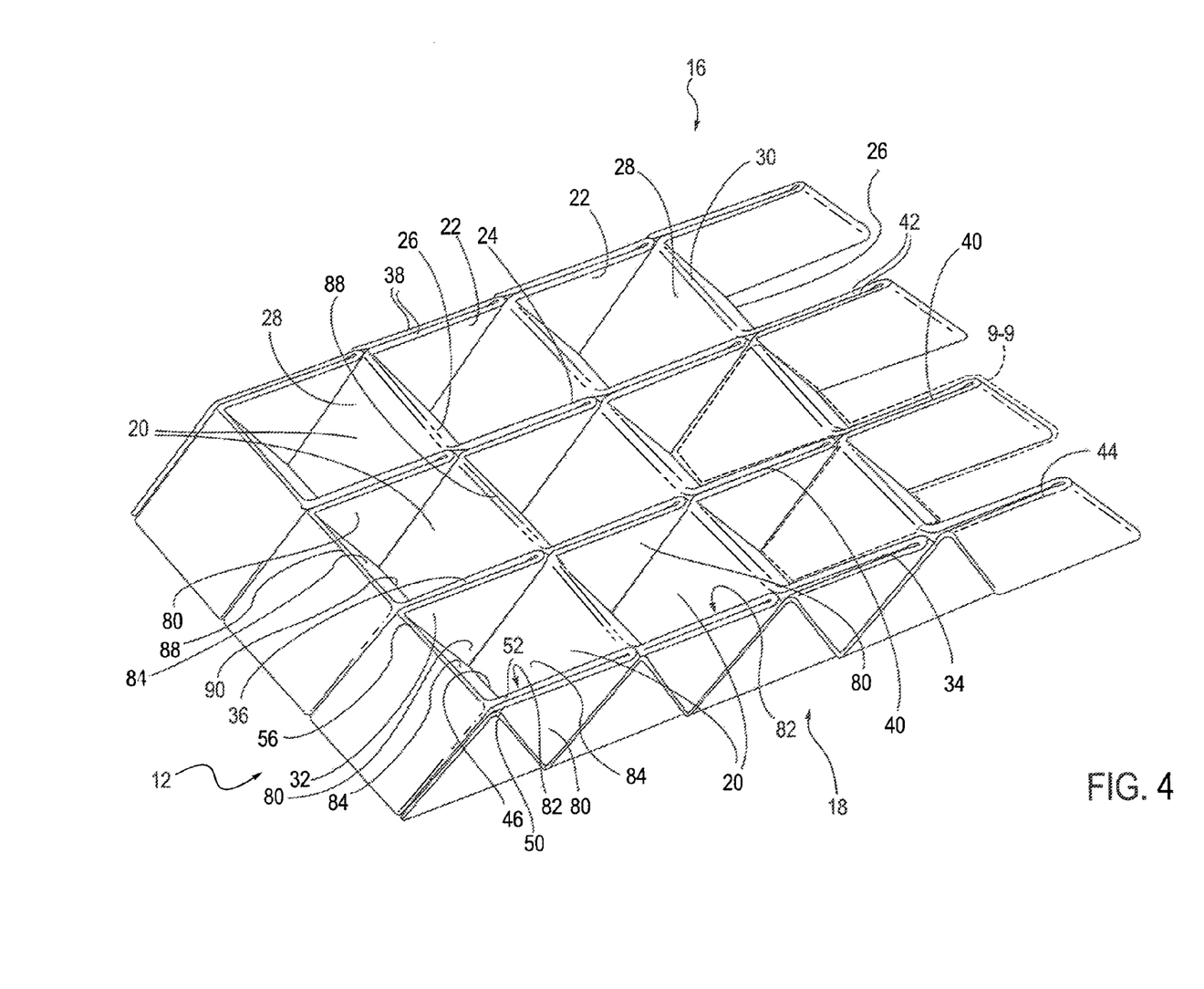
FIG. 4 is a perspective view of the structure incorporated into the structure of FIG. 1 taken along the line 4-4 of FIG. 1.
Figure 5:
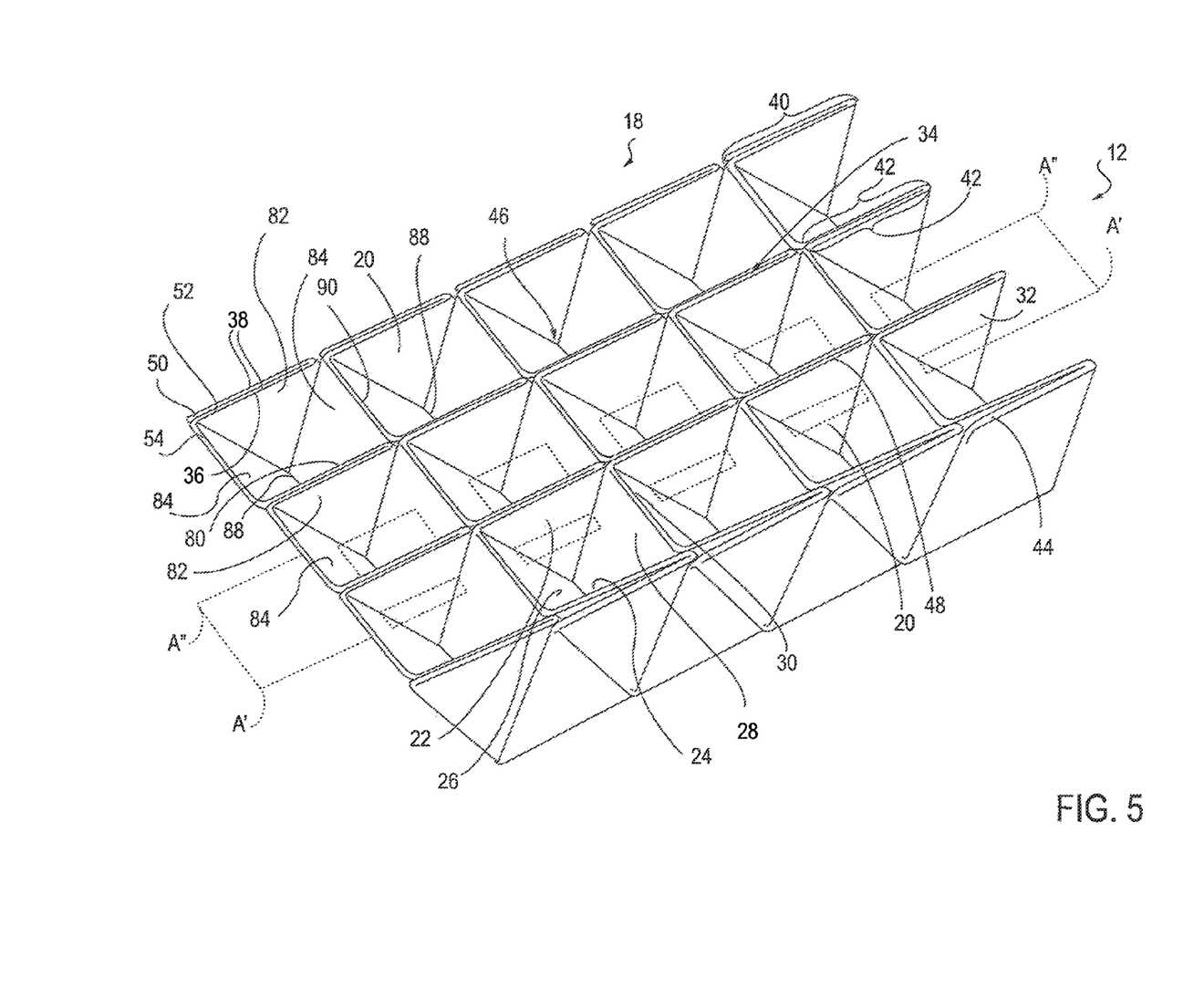
FIG. 5 is a perspective view of the structure incorporated into the structure of FIG. 1 taken along the line 5-5 of FIG. 1.
Figure 9:
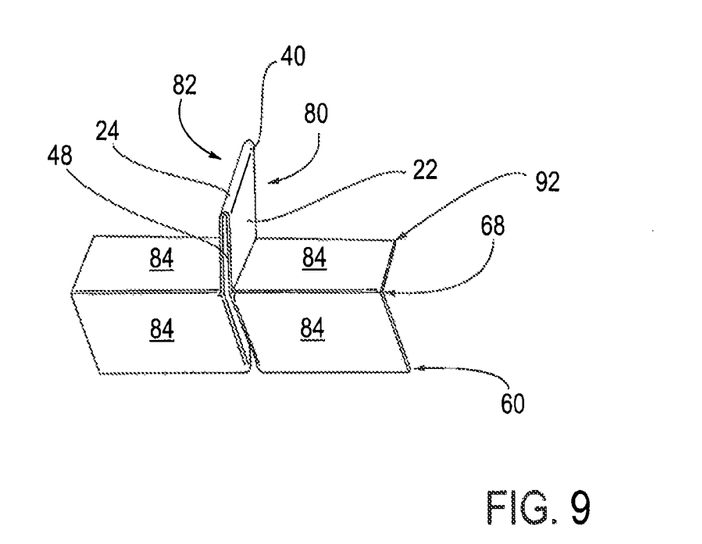
FIG. 9 is a perspective view of a portion of the sheet of material of FIG. 6 in a fully folded state to form a portion of the structure of FIG. 4 shown by the dashed area 9-9 of FIG. 4.

Each two-ply portion 36 of the material 12 of each of the first 22 and second 24 endwalls joins at a top fold 38. Two adjacent top folds 38 comprise the top of the rail, or four-ply wall 32, that is part of the first surface 16 to which a liner 14 may be attached and part of the second surface 18 to which a liner 14 may be attached. In addition, the first surface 16 (and/or second surface 18) serves as a platform for supporting an adhesive, or provides a surface for welding or soldering, that secures the liner 14 to the surface, Accordingly, the two adjacent two-ply folds 36 form part of a support rail 32, the top 34 of which extends along the first surface 16 and along the second surface 18. Each substantially continuous four-ply wall 32 is formed from a plurality of longitudinally disposed, four-ply wall segments 40 (see FIGS. 4 and 9). As indicated, these four-ply wall segments 40 are formed by the folding of the medium 12, resulting in the repeating pattern of cells 20, each cell 20 formed in part by a two-ply wall segment 42, and a side wall 26, 28 of each adjacent pair of cells 20 forming the four-ply wall segment 40. The pattern results in the formation of at least one, but preferably a plurality of, parallel extending "double" ridges or rails 32 which are four-plies thick from the folding of the single-ply medium 12. As can be seen in FIG. 4 and FIG. 5, the plurality of substantially continuous four-ply walls 32 extend parallel to each other.

Each of the two-ply wall segments 42 is formed from material 12 having a fold 44 extending longitudinally along the two-ply wall segment 42, as shown in FIG. 5. As can be seen from a comparison of FIGS. 6 and 7 with FIGS. 4 and 5, as the material folds at the two-ply wall folds 44, these two-ply wall segments 42 are formed and further positioned adjacent to additional two-ply wall segments 42 to form the cells 20 and four-ply wall segments 40 described heroin.

The pattern of repeating cells 20 forms a structure 10 having a plurality of columns, or four-ply walls 32, and recesses 46 formed from the plurality of cells. Namely, the single sheet of material 19 forms the substantially continuous four-ply wall 32 of the material, described above, between each adjacent pair of columns and recesses. Each recess is formed, in part, by the spaced-apart four-ply wall segments 40.

In addition to the four-ply wall structure 32, the cells 20 formed comprise a repeating pattern of ascending facets or sloped sidewalls 28 and descending facets or sloped sidewalls 26 (see FIGS. 1-5). The combination of each adjacent ascending facet or sloped sidewall 28 and descending facet or sloped sidewall 26 forms an apex, or peak 30, and a valley or recess 46. Specifically, a recess or valley 46 is formed by facets 26 and 28 and a pair of adjacent four-ply wall segments 40 or two-ply wall segments 42. Likewise, the peak 30 is formed by facets 26, 28 and at a peak fold 88. Adjoining facets 26 and 28 meet at the top at a ridge or peak 30, the peak fold 88, and at the bottom or base of the valley 46, the valley fold 90. The peaks or ridges 30 and valleys 46 are perpendicular to the four-ply wall structure 32. Accordingly, the architecture of the folded medium 12 is comprised of a repeating pattern of facets 26, 28 that are angled to follow a contoured path.

Figure 6:
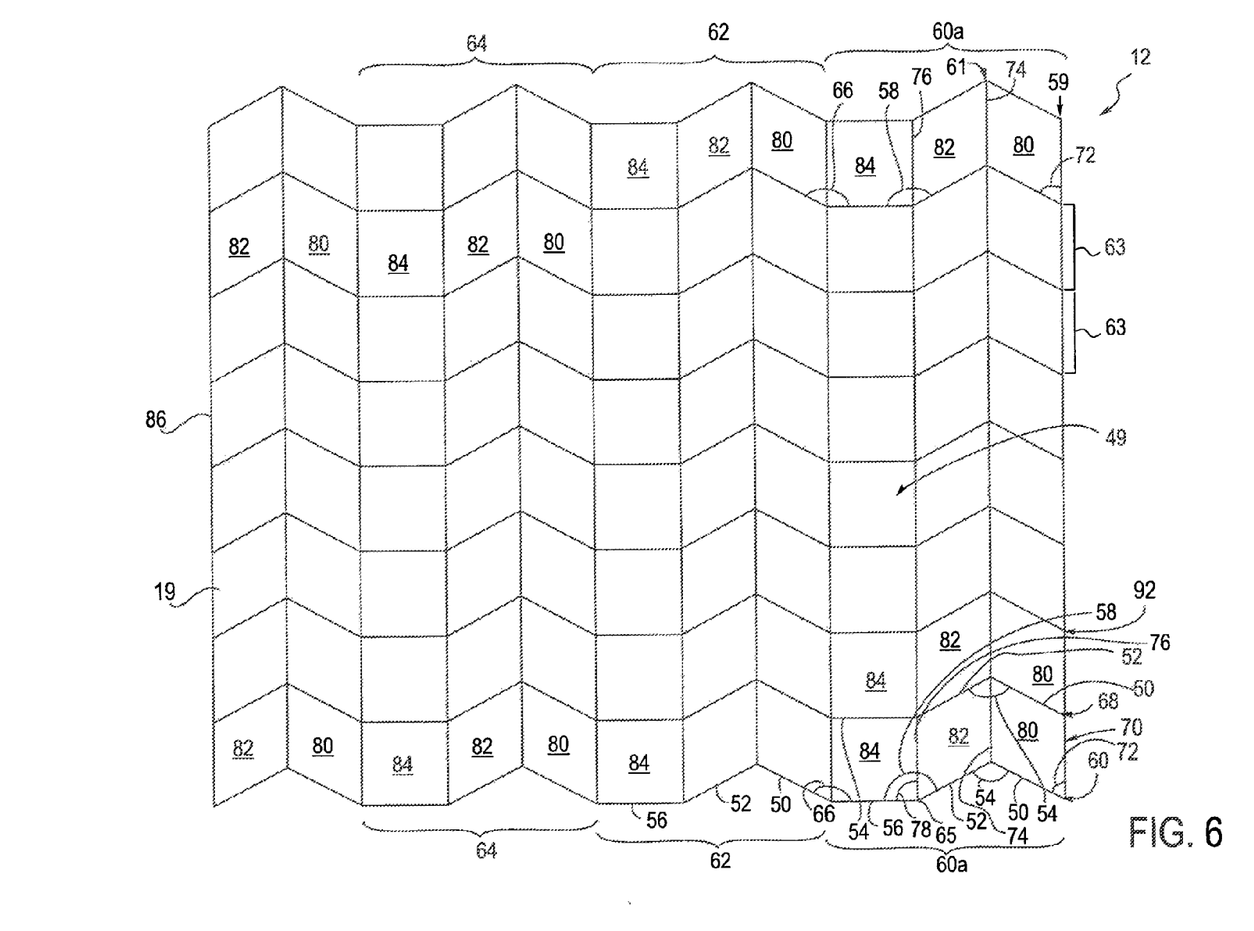
FIG. 6 is a plan view of an unfolded sheet of material as creased to form the structure of FIG. 4.

To form the structure 10 set forth in FIGS. 1-5, the material 12 must be folded from a substantially flat, planar state (see FIG. 6). The tessellated medium 12 herein changes in three directions as it is folded from its planar, unfolded state, as shown in FIG. 6, into the form shown in FIGS. 4 & 5. Specifically, the medium 12 increases in height (the z-axis), while decreasing in both length (the x-axis) and in width (the y-axis).

In further detail, referring to FIG. 4, three structural planes of a folded tessellated medium 12 exist, including the x-axis, the y-axis and the z-axis. Once the tessellated medium 12 folds into its designated form, the vertical walls 32 extend in the y-axis. These walls are the four-ply thick walls 32 that effectively create a continuous rail. This four-ply structure 32, which is rigid, provides substantial strength to the three-dimensional support structure 10. Specifically, a vertical fold 44 as provided, due to the four-ply wall structure, is not a flexible contact point and is thus quite strong. Preferably, a plurality of rows of parallel ridges 34 formed by the top of the wall structure 32 are created. As can be seen in FIGS. 4 and 5, these top 34 of rails 32 exist on two of the two major surfaces 16, 18 of the folded material. Likewise, the medium 12, in its folded state, also comprises cells 20 on two major surfaces 16, 18 of the folded medium 12.

The folded medium 12 provides a unique platform for application of an adhesive, or for welding or soldering. Specifically, the rows of four-ply structures 32, 40 provide superior adhesion surfaces. For example, an adhesive, such as corn starch and other adhesives commonly used for packaging structures currently commercially available, is applied between the top portion 34 of the four-ply wall structure 32 and the liner 14, and secures the liner 14 in position on the folded tessellated medium 12. Likewise, the top portion 34 of the four-ply wall structure 32 and the liner 14 may be welded, soldered, or otherwise fused together by means commonly used to attach two materials, such as plastic or metal, together. Namely, when the tessellated forms are folded, the plurality of parallel ridges 34 that are created provide adhesion or welding or soldering surfaces. When adhesive is used, the adhesive is preferably applied to the apex of the folds 44 for attaching the liner 14. Moreover, four-plies of material provide a platform for receiving and retaining an adhesive, increasing, and preferably doubling, the surface for adhesive application, thereby minimizing delamination issues. The same location would also be used for welding or soldering. Additionally, small pockets 48 are formed between the parallel two-ply rails 42 that make up the four-ply rail structure 34 to capture additional adhesive.

The cells 20 on each of the two major surfaces 16, 18 of the medium 12 also add certain advantages. For instance, when one or more liners 14 are bonded to the surface or surfaces 16, 18, the cells 20 are closed, sealing air within each cell. As a result, these cells 20 provide superior insulation qualities for thermal applications, such as may be used in the food industry or, for example, pizza boxes, FIG. 6 shows a plan view of an unfolded tessellated medium 12, which when folded, forms the structure of FIGS. 1-5. As indicated, the medium 12 herein is folded, rather than curved. To accommodate same, creases or scores exist where the folding is to take place. The unfolded tessellated medium 12 preferably contains a repeating pattern of scores or creases that comprise the "fold lines" of the tessellated medium 12. In broad terms, the contour path for the tessellated medium is comprised of a sheet of material 19 having a plurality of first crease paths 59, 61 extending parallel to each other and a plurality of second crease paths 60, 68 extending parallel to each other and intersecting the first crease paths 59, 61, Each first crease path 59, 61 is formed from a plurality of first path segments 63. Each second crease path 60, 68 is formed from a repeating pattern of first and second chevron legs 50, 52 and a straight line or leg 56 extending from a free end 65 of one of the first and second chevron legs 50, 52. The two legs or lines of the chevron are equal in length and typically angled 120°. The straight line extends from either line end. The third line may be of any length. Each second crease path 60 is foldable in an opposite direction from the adjacent second crease path 68, This results in the formation of an alternating pattern of ridges or peaks 30 and valleys 46 as the sheet of material 19 is folded, Each of the first crease paths 59, 61 are straight lines extending between the ridges 30 and valleys 46 of adjacent second crease paths 60, 68 to form a pattern of facets 80, 82, 84 on the first surface 49 of the sheet of material 19. The sheet of material 19 is foldable along the first and second crease paths 59, 61, 60, 68 to form a three dimensional support structure 10. The three dimensional support structure 10 extends in a plane, partially shown in dotted lines in FIG. 5 and identified therein by letters A'-A", characterized by a repeating pattern of normal walls, or end walls 22, 24, formed by the facets 80, 82 between the chevron 50, 52 and inclined walls 26, 28 formed by the facets 84 between the straight lines or third legs 56. The normal walls 22, 24 extend perpendicular to the plane A'-A". The inclined walls 26, 28 are inclined relative to the plane A'-A", The normal walls 22, 24 comprise a wall 32 having four plies of the sheet of material 19. A liner 14 may be attached to the three dimensional support structure 10 at the top 34 of the four-ply wall 32.

The scoring pattern of the planar structure discussed above is explained in further detail hereinbelow. For purposes of discussion only, the fold lines of the medium 12 will described as "legs", however, any designation would be acceptable for the purposes provided.

Referring to FIGS. 6-9, in a preferred embodiment, the material 12 comprises a first leg 50 and a second leg 52 forming the first chevron. The first leg 50 and second leg 52 are preferably of equivalent length. A first angle 54 exists between the first leg 50 and the second leg 52. The angle 54 preferably comprises an angle of 120°. A third leg 56 extends from the second leg 52, and as shown in the Figures is of a greater length than the first and second legs, but may be of any length to accommodate manufacturing preferences. The third leg 56 extends from the second leg 52 at a second angle 58 of 150°. The series of first 50, second 52, and third 56 legs comprises the structure that forms a repeating pattern of the medium 12 described above.

The third leg 56 of the first pattern 60a of the second crease path 60 is connected to the first leg 50 of the adjacent or second pattern 62 of the second crease path 60 along the y-axis, the third leg 56 of the second pattern 62 is connected to the first leg 50 of the adjacent or third pattern 64 of the second crease path 60 along the y-axis, and so forth, A third angle 66, which is between the third leg 56 of the first pattern 60a and the first leg 50 of the adjacent or second pattern 62, comprises an angle of 150° opposite the second angle 58.

Connecting the repeating adjacent pattern of the second crease path 60 to a parallel repeating pattern of the second crease path 68 in the x-axis is a plurality of additional legs. Namely, a fourth leg 70 extends at a fourth angle 72 of 60° from the first leg 50 to connect the first leg 50 of the first pattern 60a of the second crease path 60 with a corresponding first leg 50 of an adjacent parallel pattern 60a of the second crease path 68 in the x-axis. A fifth leg 74 extends from the apex of the second angle 54 on the first pattern 60a of the second crease path 60 to the apex of the second angle 54 of the adjacent parallel pattern 60a of the second crease path 68 in the x-axis. A sixth leg 76 extends at a fifth angle 78 of 90° from the third leg 56 on the first pattern 60a of the second crease path 60 to the corresponding point on the third leg 56 of the adjacent parallel pattern 60a of the second crease path 68 in the x-axis. As with the foregoing, this combination forms a repeating pattern.

Figure 8:
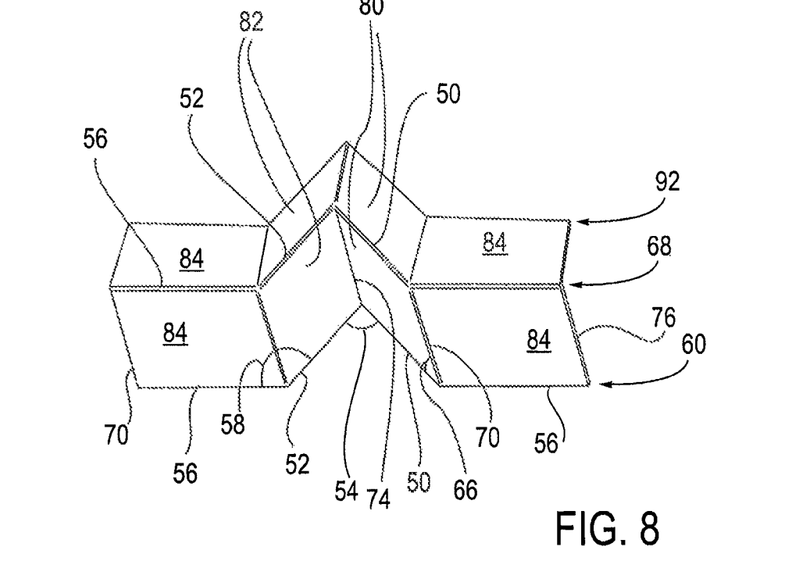
FIG. 8 is a perspective view of a portion of the sheet of material of FIG. 6 in its partially folded state.

The combination of these adjacent and parallel repeating patterns of legs in the x- and y-axis, and their corresponding angles, form the architecture of the tessellated medium 12. Accordingly, as shown in FIG. 8, the first leg 50 of the first pattern 60a of the second crease path 60 and the first leg 50 of a second, parallel pattern 60a of the second crease path 68 in the x-axis are linked by the fourth leg 70 and the fifth leg 74, defining a first facet 80. Likewise, the second leg 52 of the first pattern 60a of the second crease path 60 and the second leg 52 of the second, parallel pattern 60a of the second crease path 68 in the x-axis are linked by the fifth leg 74 and the sixth leg 76, defining a second facet 82. The third legs 56 of corresponding parallel patterns 60a of the second crease paths 60, 68 in the x-axis are linked by the sixth leg 76 and a fourth leg 70 of an adjacent pattern 62, defining a third facet 84. These three facets 80, 82, 84 repeat in both the y-axis (repeating in series as 80, 82, 84) and in the x-axis (repeating as the identical facet)(see FIG. 6).

Any number of repeating facets 80, 82, 84 may be used to form the material comprising the three-dimensional support structure 10. Preferably, the size of the three-dimensional support structure is defined by the number of facets, the size of the facets, or the legs creating the facet, and the desired size of the structure to be created by the folded tessellated medium.

As described, the scores, or legs, of the tessellated medium 12 serve to assist in folding the medium 12 into the structure shown in FIGS. 1-5. As the medium 12 is folded (see FIG. 7), the scores cooperate to form a series of peaks 30 and valleys 46 in the medium 12 ultimately resulting in the repeating pattern of cells 20 described herein and shown in FIGS. 3 & 4. For purposes of description herein, the folds that form peaks, generally, will be described as "peak" folds 88, while the folds that form valleys, generally, will be described as "valley" folds 90. However, these designations are merely provided for purposes of description herein, and other designations would be acceptable for the purposes provided.

Figure 7:
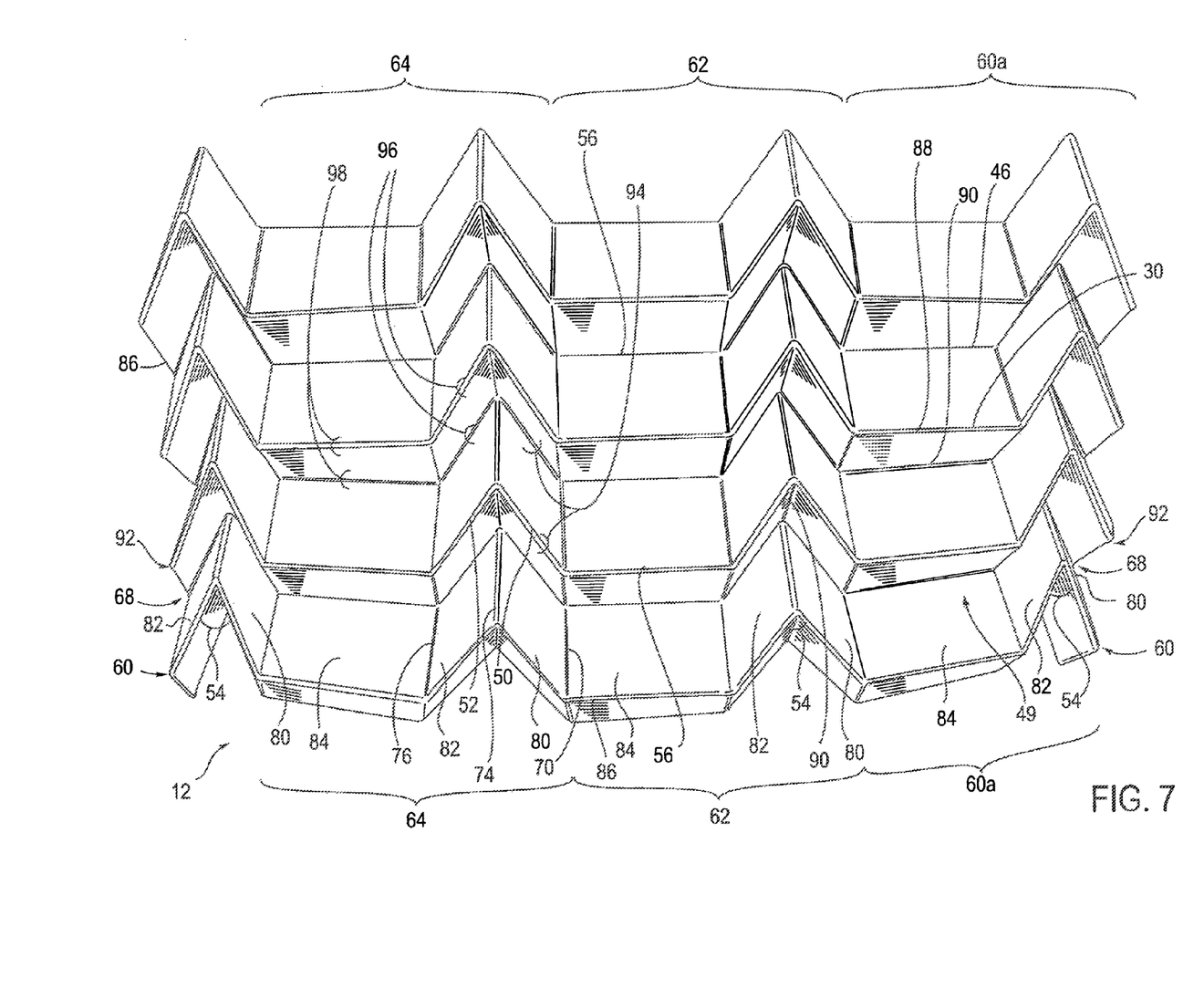
FIG. 7 is a perspective view of the sheet of material of FIG. 6 partially folded to form the structure of FIGS. 4 and 5.

In each repeating pattern 60a of the second crease path 60, the score line of the subsequent, adjacent parallel pattern 60a of the second crease path 68 is oriented to fold in the opposite direction to the pattern 60a of the second crease path 60. This results in an alternating pattern of ridges or peaks 30 and valleys 46. As shown in FIG. 7, the score lines of the fourth leg 70, the fifth leg 74 and the sixth leg 76 form straight lines extending between the peak folds 88 of the ridges 30 and the valley folds 90 of the valleys 46 of the adjacent patterns 60a of the second crease paths 60, 68 to form a pattern of facets 80, 80, 84 on the first surface 49 of the medium 12. For example, the fourth leg 70 may be scored to form a valley fold 90. The fifth leg 74 (which defines the second facet 82, as described above) is scored to form a peak fold 88. The sixth leg 76 (which defines the third facet 84, as described above), like the fourth leg 70, is the scored to form a valley fold 90. As a result, a peak or apex is created between the facets 80, 82. In the adjacent parallel pattern 60a of the second crease path 68 to the first pattern 60a of the second crease path 60 along the x-axis, these score lines are oriented for folding in the opposite direction to those set forth in the previously described pattern.

Similarly, the legs of sequential parallel patterns 60a of the second crease paths 60 and 68, and in particular, each of the first 50, second 52, and third 56 legs, in sequential patterns along the x-axis, are oppositely scored so that each leg 50, 52, 56 in the pattern of the second crease path 60 folds in a direction opposite to the identical leg in the parallel pattern of the second crease path 68. In other words, with the exception of the outer edge 86 or end of the pattern, the first leg 50 of the pattern 60a of the second crease path 60 comprises a valley fold 90, while the first leg 50 of the pattern 60a of the second crease path 68 comprises a peak fold 88. The first leg 50 of the pattern 60a of second crease path 92 forms a valley fold 90. As a result, a peak is created, the apex of which is the first leg 50 of the second pattern 60a of second crease path 68. The first 50, second 52 and third 56 legs of the parallel pattern, along the y-axis, maintain the same fold orientation throughout the repeating pattern 60, 62, 64. Only the legs in the parallel patterns along the x-axis alternate in fold orientation. Thus, the repeating adjacent pattern of first 50, second 52, and third 56 legs along the y-axis may all comprise an peak fold 88, or alternatively, may all comprise a valley fold 90 orientation.

In addition to the varying fold orientations, as the medium 12 is folded, the first angle 54 narrows, resulting in slopes or facets 80, 82 of increasing steepness. The fold may be continued until the first angle 54 reaches approximately 0° (the angle being limited by the width of the material used). Upon reaching this approximately 0° angle, the faces of the first 80 and second 82 facets formed between a first repeating pattern 60a of the second crease path 60 and first repeating pattern 60a of the second crease path 68 are in substantial contact with one another (see FIG. 9). At the same time, the first 80 and second 82 facets formed between the parallel pattern 60a of the second crease path 68 and parallel pattern 60a of an additional crease path, identified by 92, in the x-axis fold to face away from one another. The first 80 and second 82 facets of immediately parallel repeating patterns in the x-axis form the four-ply wall structure 32 described herein. Namely, the first facet 80 between first parallel patterns 60a of crease paths 60 and 68 and the first facet 80 between first parallel patterns 60a of crease path 68 and crease path 92 form a first two-ply wall segment 42, while the second facet 82 between first parallel patterns 60a of crease paths 60 and 68 and the second facet 82 between first parallel patterns 60a of crease paths 68 and 92 form a second two-ply wall segment 42. The first two-ply wall segment 42 is formed by a peak fold 88 of the medium 12 at the first leg 50. The second two-ply wall segment 42 is formed by a peak fold 88 of the medium 12 at the second leg 52. The combination of the first two-ply wall segment 42 and the second two-ply wall segment 42, in the folded state with the first angle 54 at approximately 0° forms the four-ply wall segment 40.

As alluded to above, during folding of the medium 12, the angles between facets on the crease paths 60, 68 of parallel repeating patterns 60a in the x-axis also change. Namely, as the material is folded, the angle increases or decreases in degrees at the first leg 50, the second leg and the third leg 56. Referring to FIG. 7, the angle 94 defined at the first leg 50 by the first facets 80 of the parallel patterns 60a in the x-axis (as well as the angle 96 defined at the second leg 52 by the second facets 82 of parallel patterns 60a) changes from 180° (in the medium's completely unfolded state (FIG. 6)) to nearly 0° (in the completely folded state of the structure (FIG. 4)). The angle 94, 96 in the folded state is limited only by the width of the medium 12. The angle 98 defined at the third leg 56 by the third facets 84 of the parallel patterns 60a changes from 180° (in a completely unfolded state) to an angle of approximately 60°. Based upon the alternation between the valley 90 and peak folds 88, this angle 98, likewise, alternates in orientation, resulting in a series of peaks 30 and valleys 46. These peaks 30 and valleys 46 are positioned between parallel four-ply wall structures 32.

While specific dimensions and patterns are set forth hereinabove, the dimensions and angles can be adjusted for specific applications without departing from the overall scope of the present invention. Moreover, examples of particular adjacent and/or parallel patterns have been given herein. These examples may be applied to other locations on the medium 12, such as a third or fourth of fifth pattern, and so forth. Likewise, orientations of the various patterns may be reversed from the specific discussion hereinabove without departing from the scope of the present invention.

The three-dimensional support structure of a preferred embodiment comprises a medium 12 that is formed with a combination of folds rather than being shaped into flutes as, for example, is common with corrugated board. Furthermore, the medium 12 or material of the preferred embodiment comprises a tessellated medium 12 having an architecture that allows the weights of liners 14 and medium 12 or material to be reduced while achieving the same, or better performance, than comparably rated products. In addition, a weight reduction further results from a decrease in the volume of material used to prepare a structure, such as a package, or similar product, using the structure of the embodiments disclosed. For example, due to the unique architecture of the three-dimensional support structure, applications involving a metal medium 12, can be used to form a strong, rigid support structure even with extreme material thicknesses, such as a minimal thickness between 0.125-0.25 inch, which greatly reduces weight and material costs, and is a significant advantage over currently available products. The architecture of the multi-planar structure, as shown in FIGS. 4 & 5, created by the folding of the material or medium 12 allows the height of the folded structure 10, and thus the thickness, to be varied to a dimension greater than that available in current products, such as corrugated board, without loss of structural stability. The structure 10, can be formed of any height, for example up to 1.5 inches, with a single sheet while retaining the same structural stability. The height is varied by altering the dimensions of the score lines. Preferably, a thickness of up to 1.5 inches for specialty applications, such as pallets can be created from a single sheet of material. In comparison, corrugated board in a single wall format cannot exceed Y4 inch in height as it becomes structurally unstable. Furthermore, corrugated board's maximum height of 0.5 inch can only be achieved with a triple-wall configuration.

Advantageously, the four-ply walls 32 of the three-dimensional structure 10 prevent flexing a curvature along the x-axis. Likewise, these four-ply walls permit curvature along the y-axis without anticlastic curvature in metal and plastic applications.

In addition to the capability described above, as a result of the multi-dimensional folded architecture, which creates significant structural stability and firm or rigid contacts at the various rails 34, the three-dimensional support structure 10 comprises significant strength and enhanced performance over currently available products, and permits the use of lighter weight material for the medium 12. For instance, the structure 10 disclosed herein (FIG. 1) when used for packaging, due to its rigid multi-planar structure, features ECT (Edge Crush Test) performance both laterally and longitudinally. By comparison, corrugated board can perform in only a single dimension. The dual ECT format of the three-dimensional support structure 10 results in stronger container board boxes.

While the three-dimensional support structure 10 may be stronger than currently available products, additional strength can be added to the folded structure. Specifically, the structure 10 disclosed herein can be varied in strength by three different methods, namely, by changing the length of the facets 80, 82, 84, by changing the medium thickness, and/or by altering the weight of the liner 14 and medium 12 materials. In comparison, the strength of products, such as plastic, metal, or corrugated board can only be adjusted by varying the weight of the liner and medium Moreover, the structure 10 disclosed, of a single wall format (i.e, a liner-medium-liner format), can outperform double wall formats, such as corrugated board (i.e. liner-medium-liner-medium-liner format). As a result, the structure of the preferred embodiment uses less material (or paper in a board-type structure) than traditional double wall corrugated board. This reduction is also reflected in product weight loss, and in space saving for both storage and transport.

In addition, the grid platform (shown in FIGS. 4 & 5) created by the folded medium 12 provides a foundation to support a printed substrate for boxes, such as a liner 14. The grid platform prevents the substrate from becoming slack, as corrugated is prone to do because multiple contact points exist.

Using the three-dimensional support structure described herein, a device or package may be formed, Specifically, a device or package or their components may be formed having multiple walls, such as a box or a divider, wherein a plurality of structures 10 are integrally connected to form a single package or device. The integral connection of a plurality of structures of the present invention may occur through bonding, such as by adhesive or by other means, such as welding or soldering. Likewise, a single sheet of the structure 10 may be folded into the desired shape.

Manufacturing the three-dimensional support structure 10 of the preferred embodiment has several significant advantages over, for example corrugated board, For instance, the structure does not require steam for purposes of shaping the medium because it is folded rather than shaped. Likewise, the structure does not need to be heated for purposes of formation and drying. The structure does not comprise multiple components that need to be adhered or welded together. Moreover, application of an adhesive, such as corn starch or other adhesive substrate, can be completed at a reduced temperature.

Accordingly, the foregoing description and drawings disclose a three-dimensional support structure that achieves equal or greater performance to standard materials, with materials of lesser weights, The structure comprises a medium 12 that is folded to form a repeating pattern of cells 20 and parallel four-ply rails 34, to which a liner 14 is adhesively attached, welded, or soldered.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, counterclockwise, x-axis, y-axis, and z-axis) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected) are to be construed broadly and may include intermediate members between a connection of elements and relative movement between elements. As such, joinder references do not necessarily infer that two elements are directly connected and in fixed relation to each other.

In some instances, components are descried with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise. near the terminus of a particular element, link, component, part, member. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

I claim:

1. A method for creating a three-dimensional support structure having opposite first and second surfaces, comprising providing a single sheet of foldable material having first and second orthogonal axes and a plurality of first crease paths spaced apart along the first axis and a plurality of second crease paths spaced apart along the second axis wherein each first crease path includes a repeating pattern of a line segment having opposite first and second ends and of first and second chevron legs extending respectively from the first and second ends of the line segment at an obtuse angle from the line segment in the same direction relative to the first axis and in opposite directions relative to the second axis with each of the first and second chevron legs having an end and being equal in length and wherein one of the plurality of second crease paths has at least first and second path segments extending between the ends of the first chevron leg of each adjacent pair of first crease paths and another of the plurality of second crease paths has at least first and second path segments extending between the ends of the second chevron leg of each adjacent pair of first crease paths, folding the sheet of foldable material along each of the first crease paths and along each of the first path segments in a first direction and along each of the second path segments in a second direction opposite to the first direction so that each first crease paths forms a ridge disposed in the first surface of the support structure.

2. The method of claim 1, further comprising compressing the sheet of foldable material along the second axis so that the first chevron leg of one repeating pattern moves closer to the second chevron leg of another repeating pattern.

3. The method of claim 2, wherein the compressing step includes compressing the sheet of foldable material so that the first and second chevron legs of each first crease path extends substantially parallel to the first axis.

4. The method of claim 1, wherein for each first crease path the end of each first chevron leg of one repeating pattern is joined to the end of the second chevron leg of the adjoining repeating pattern.

5. The method of claim 1, wherein the plurality of second crease paths extend parallel to each other when the sheet of material is unfolded.

6. The method of claim 5, wherein the plurality of second crease paths extend parallel to the first axis when the sheet of material is unfolded.

7. The method of claim 1, wherein for each first crease path the first chevron legs are parallel to each other, the second chevron legs are parallel to each other and the line segments are collinear in each case when the sheet of material is unfolded.

8. The method of claim 1, wherein the line segments of the plurality of first crease paths are parallel to each other when the sheet of material is unfolded.

9. The method of claim 8, wherein the first chevron legs of the plurality of first crease paths are parallel to each other and the second chevron legs of the plurality of first crease paths are parallel to each other in each case when the sheet of material is unfolded.

10. The method of claim 9, wherein the line segments of the plurality of first crease paths are equal in length, the first chevron legs of the plurality of first crease paths are equal in length and the second chevron legs of the plurality of first crease paths are equal in length and wherein the plurality of second crease paths extend parallel to each other when the sheet of material is unfolded.

11. The method of claim 10, wherein the sheet of foldable material includes a first additional second crease path extending between the first end of the line segments of each adjacent pair of first crease paths and a second additional second crease path extending between the second end of the line segments of each adjacent pair of first crease paths.

12. The method of claim 11, wherein the first additional second crease path and the second additional second crease path each includes at least first and second path segments, and wherein the folding step includes folding the sheet of foldable material along the first path segment of each first additional second crease path and each second additional crease path in the first direction and along the second path segment of each first additional second crease path and each second additional crease path in the second direction.

13. The method of claim 8, wherein the line segments of the plurality of first crease paths are perpendicular to the second crease paths when the sheet of material is unfolded.

14. The method of claim 1, wherein the first chevron legs of the plurality of first crease paths are parallel to each other and the second chevron legs of the plurality of first crease paths are parallel to each other in each case when the sheet of material is unfolded.

15. The method of claim 1, wherein each line segment is straight.

16. The method of claim 1, wherein the sheet of foldable material includes an additional first crease path provided between each adjacent pair of the plurality of first crease paths, each additional first crease path including the repeating pattern and each pair of first and second path segments of the one of the plurality of second crease paths connected to each other at the end of the first chevron leg of the additional first crease path and each pair of first and second path segments of the another of the plurality of second crease paths connected to each other at the end of the second chevron leg of the additional first crease path and wherein the folding step includes folding the sheet of foldable material along the additional first crease path in the second direction so that each additional first crease path forms a ridge disposed in the second surface of the support structure.

17. The method of claim 16, wherein sheet of foldable material includes a first additional second crease path extending between the first end of the line segments of each adjacent pair of the plurality of first crease paths and a second additional second crease path extending between the second end of the line segments of each adjacent pair of the plurality of first crease paths and wherein the first additional second crease path and the second additional second crease path each include first and second path segments and each pair of first and second path segments of the first additional second crease paths are connected to each other at the first end of the line segments of the .additional first crease path and each pair of first and second path segments of the first additional second crease paths are connected to each other at the second end of the line segments of the additional first crease path.

18. The method of claim 17, wherein the plurality of second crease paths extend parallel to each other when the sheet of material is unfolded.

19. The method of claim 8, wherein each line segment of the plurality of first crease paths and the additional first crease paths is straight.

20. The method of claim 1, further comprising weakening the sheet of foldable material along each of the plurality of first crease paths and along each of the plurality of second crease paths by the means selected from the group consisting of scoring and creasing.

* * * * *